(12) United States Patent
Georgiev

(10) Patent No.: US 8,358,366 B1
(45) Date of Patent: Jan. 22, 2013

(54) METHODS AND APPARATUS FOR HIGH-SPEED DIGITAL IMAGING

(75) Inventor: Todor G. Georgiev, Sunnyvale, CA (US)

(73) Assignee: Adobe Systems Incorporate, San Jose, CA (US)

( * ) Notice: Subject to any disclaimer, the term of this patent is extended or adjusted under 35 U.S.C. 154(b) by 421 days.

(21) Appl. No.: 12/790,677

(22) Filed: May 28, 2010

(51) Int. Cl.
  *G02B 13/16* (2006.01)
  *H04N 5/225* (2006.01)
(52) U.S. Cl. ......... 348/335; 348/340; 348/345; 348/348
(58) Field of Classification Search .................. 348/335, 348/340.345, 348; 250/208.1; 257/290–292
  See application file for complete search history.

(56) References Cited

U.S. PATENT DOCUMENTS

| | | | |
|---|---|---|---|
| 2,039,648 A | 5/1936 | Ives et al. |
| 3,985,419 A | 10/1976 | Matsumoto et al. |
| 4,193,093 A | 3/1980 | St. Clair |
| 4,230,942 A | 10/1980 | Stauffer |
| 4,580,219 A | 4/1986 | Pelc et al. |
| 4,732,453 A | 3/1988 | de montebello et al. |
| 4,849,782 A | 7/1989 | Koyama et al. |
| 5,076,687 A | 12/1991 | Adelson |
| 5,361,127 A | 11/1994 | Daily |
| 5,400,093 A | 3/1995 | Timmers |
| 5,729,011 A | 3/1998 | Sekiguchi |
| 6,097,394 A | 8/2000 | Levoy et al. |
| 6,097,541 A | 8/2000 | Davies et al. |
| 6,137,535 A | 10/2000 | Meyers |
| 6,339,506 B1 | 1/2002 | Wakelin et al. |
| 6,351,269 B1 | 2/2002 | Georgiev |
| 7,019,671 B2 | 3/2006 | Kawai |
| 7,085,062 B2 | 8/2006 | Hauschild |
| 7,620,309 B2 | 11/2009 | Georgiev |
| 7,732,744 B2 | 6/2010 | Utagawa |
| 7,792,423 B2 | 9/2010 | Raskar et al. |
| 7,880,794 B2 | 2/2011 | Yamagata et al. |
| 7,962,033 B2 | 6/2011 | Georgiev et al. |

(Continued)

FOREIGN PATENT DOCUMENTS

JP    7270791    10/1995

(Continued)

OTHER PUBLICATIONS

JP504669 (1975), all pages, english equivalent is U.S. Patent 3985419, dated Oct. 12, 1976 by Matsumoto, et al.

(Continued)

*Primary Examiner* — Yogesh Aggarwal
(74) *Attorney, Agent, or Firm* — Robert C. Kowert; Meyertons, Hood, Kivlin, Kowert & Goetzel, P.C.

(57) ABSTRACT

Methods and apparatus for high-speed digital imaging. Temporal modulation technology, for example digital micromirror device (DMD) technology, may be integrated with focused plenoptic camera technology to produce a compact and relatively inexpensive high-speed digital video camera capable of capturing video clips at frame rates up to and including 32,000 (32K) frames per second, or higher. In embodiments, the temporal modulation technology is used to temporally modulate image data captured in a single exposure; the temporally modulated image data is captured in a single raw image using focused plenoptic camera technology. A rendering method may be applied to the raw image data to extract multiple frames captured at the frame rate, the frames each showing an image of a scene at a different time in a sequence, the duration of which is the exposure time.

20 Claims, 9 Drawing Sheets

U.S. PATENT DOCUMENTS

| | | | |
|---|---|---|---|
| 8,019,215 | B2 | 9/2011 | Georgiev et al. |
| 2001/0012149 | A1 | 8/2001 | Lin et al. |
| 2001/0050813 | A1 | 12/2001 | Allio |
| 2003/0218753 | A1* | 11/2003 | Reuter ............................ 356/445 |
| 2003/0231255 | A1 | 12/2003 | Szajewski et al. |
| 2005/0088714 | A1 | 4/2005 | Kremen |
| 2005/0122418 | A1 | 6/2005 | Okita et al. |
| 2006/0104542 | A1 | 5/2006 | Blake et al. |
| 2007/0091197 | A1 | 4/2007 | Okayama et al. |
| 2007/0252074 | A1 | 11/2007 | Ng et al. |
| 2008/0056549 | A1 | 3/2008 | Hamill et al. |
| 2008/0107231 | A1 | 5/2008 | Miyazaki et al. |
| 2008/0152215 | A1 | 6/2008 | Horie et al. |
| 2008/0165270 | A1 | 7/2008 | Watanabe et al. |
| 2008/0166063 | A1 | 7/2008 | Zeng |
| 2008/0187305 | A1 | 8/2008 | Raskar et al. |
| 2008/0193026 | A1 | 8/2008 | Horie et al. |
| 2008/0218610 | A1 | 9/2008 | Chapman et al. |
| 2008/0247623 | A1 | 10/2008 | Delso et al. |
| 2009/0086304 | A1 | 4/2009 | Yurlov et al. |
| 2009/0140131 | A1 | 6/2009 | Utagawa |
| 2009/0185801 | A1 | 7/2009 | Georgiev et al. |
| 2009/0295829 | A1 | 12/2009 | Georgiev et al. |
| 2010/0026852 | A1 | 2/2010 | Ng et al. |
| 2010/0085468 | A1 | 4/2010 | Park et al. |
| 2010/0205388 | A1 | 8/2010 | MacInnis |
| 2010/0253769 | A1* | 10/2010 | Coppeta et al. ................. 348/58 |
| 2010/0265386 | A1 | 10/2010 | Raskar et al. |

FOREIGN PATENT DOCUMENTS

| | | |
|---|---|---|
| JP | 2001330769 | 11/2001 |
| JP | 2004239932 | 8/2004 |
| WO | 2006/057838 | 6/2006 |

OTHER PUBLICATIONS

U.S. Appl. No. 12/271,389, filed Nov. 14, 2008.

U.S. Appl. No. 12/474,112, filed May 28, 2009.

Adelson, T., and Wang, J., "Single lens stereo with a plenoptic camera," IEEE Transactions on Pattern Analysis and Machine Intelligence, vol. 14, issue 2, 99-106, 1992, (cited in U.S. Appl. No. 12/130,725).

Borman, S., and Stevenson, R., "Super-resolution from image sequences—a review", Proceedings of the 1998 Midwest Symposium on Circuits and Systems, Publication Date: Aug. 9-12, 1998, on pp. 374-378, (cited in U.S. Appl. No. 12/130,725).

Elad, M., and Feuer, A., "Restoration of a single superresolution image from several blurred, noisy, and undersampled measured images," IEEE Transactions on Image Processing Dec. 1997, (cited in U.S. Appl. No. 12/130,725).

Farsiu, S., Robinson, D., Elad, M., and Milanfar, P., "Advances and challenges in super-resolution," International Journal of Imaging Systems and Technology, 2004, (cited in U.S. Appl. No. 12/130,725).

Georgiev, T., Zheng, K., Curless, B., Salesin, D., and et al., "Spatio-angular resolution tradeoff in integral photography," Proc. Eurographics Symposium on Rendering, 2006, (cited in U.S. Appl. No. 12/130,725).

Gortler, S. J., Grzeszczuk, R., Szeliski, R., and Cohen, M. F., "The lumigraph," ACM Trans. Graph., 43-54, 1996, (cited in U.S. Appl. No. 12/130,725).

Isaksen, A., McMillan, L., and Gortler, S. J., "Dynamically reparameterized light fields," ACM Trans. Graph., 297-306, 2000, (cited in U.S. Appl. No. 12/130,725).

Levoy, M., and Hanrahan, P., Light field rendering, ACM Trans. Graph., 31-42, 1996, (cited in U.S. Appl. No. 12/130,725).

Ng, R., Levoy, M., Brdif, M., Duval, G., Horowitz, M., and Hanrahan, P., "Light field photography with a hand-held plenoptic camera," 11 pages, 2005.

Ng, R., "Fourier slice photography," International Conference on Computer Graphics and Interactive Techniques Proceedings of ACM SIGGRAPH 2005, 10 pages.

Park, S., Park, M., and Kang, M., "Super-resolution image reconstruction: a technical overview," Signal Processing Magazine, 2003, 16 pages.

Veeraraghavan, A., Mohan, A., Agrawal, A., Raskar, R., and Tumblin, J., "Dappled photography: Mask enhanced cameras for heterodyned light fields and coded aperture refocusing," ACM Trans. Graph. 26, 3, 69, 2007.

U.S. Appl. No. 12/503,803, filed Jul. 15, 2009.

U.S. Appl. No. 12/628,437, filed Dec. 1, 2009.

U.S. Appl. No. 12/636,168, filed Dec. 11, 2009.

Fife K., Gamal A. E., Wong H.-S. P.: A 3mpixel multi-aperture image sensor with 0.7um pixels in 0.11um cmos. In IEEE ISSCC Digest of Technical Papers (Feb. 2008), pp. 48-49.

Lumsdaine A., Georgiev T.: Full Resolution Lightfield Rendering. Tech. rep., Adobe Systems, Jan. 2008, 12 pages.

Baker S., Kanade T.: Limits on superresolution and how to break them. IEEE Transactions on Pattern Analysis and Machine Intelligence (Jan. 2002), 37 pages.

Bishop T. E., Zanetti S., Favaro P.: Light field superresolution. In International Conference on Computational Photography (Apr. 16-17, 2009), 9 pages.

U.S. Appl. No. 12/690,869, "Super-Resolution with the Focused Plenoptic Camera," filed Jan. 20, 2010, Todor G. Georgiev and Andrew Lumsdaine.

Levin A., Fergus R., Durand F., Freeman W.: Image and depth from a conventional camera with a coded aperture. ACM Transactions on Graphics, SIGGRAPH 2007 Conference Proceedings, San Diego, CA (2007), 9 pages.

Lippmann G.: Epreuves reversibles. photographies integrales. Academie des sciences (Mar. 1908), 446-451.

Lin Z., Shum H.: Fundamental limits of reconstruction-based super-resolution algorithms under local translation. IEEE Transactions on Pattern Analysis and Machine Intelligence vol. 26, No. 1 (Jan. 2004), 83-97.

Ng M. K., Bose N. K.: Mathematical analysis of super-resolution methodology. Signal Processing Magazine, IEEE 20, 3 (2003), 62-74.

Schultz R.: Super-resolution enhancement of native digital video versus digitized NTSC sequences. In Proceedings of the Fifth IEEE Southwest Symposium on Image Analysis and Interpretation (2002), pp. 193-197.

Wilburn B., Joshi N., Vaish V., Talvala E., Antunez E., Barth A., Adams A., Levoy M., Horowitz M.: High performance imaging using large camera arrays. In ACM Transactions on Graphics (2005), 12 pages.

Georgiev T., Lumsdaine A.: Depth of field in plenoptic cameras. In Eurographics 2009—Annex (Apr. 2009), pp. 5-8.

Lumsdaine A., Georgiev T.: The focused plenoptic camera. In International Conference on Computational Photography (Apr. 2009).

"Recording and controlling the 4D light field in a microscope using microlens arrays", Marc Levoy, Zhengyun Zhang , & Ian McDowall, Journal of Microscopy, 2009, 19 pages.

"Emerging Digital Micromirror Device (DMD) Applications", Dana Dudley, Walter Duncan, John Slaughter, DLPTM Products New Applications, Texas Instruments, Inc., Copyright 2003 Society of Photo-Optical Instrumentation Engineers., This paper was published in SPIE Proceedings vol. 4985, 12 pages.

"Programmable Imaging using a Digital Micromirror Array", Shree K. Nayar, Vlad Branzoi, Terry E. Boult, In Conf. on Computer Vision and Pattern Recognition, pp. I: 436-443, 2004.

Ng, "Digital Light Field Photography," Jul. 2006, A Dissertation Submitted to the Dept. of Computer Science and the Committee on Graduate Studies of Stanford Univ in Partial fulfillment of the requirements for the degree of Doctor of Philosophy, 203.

Georgiev, et al. "Light-Field Capture by Multiplexing in the Frequency Domain," ADOBE Technical Report, Apr. 2007, all pages.

* cited by examiner

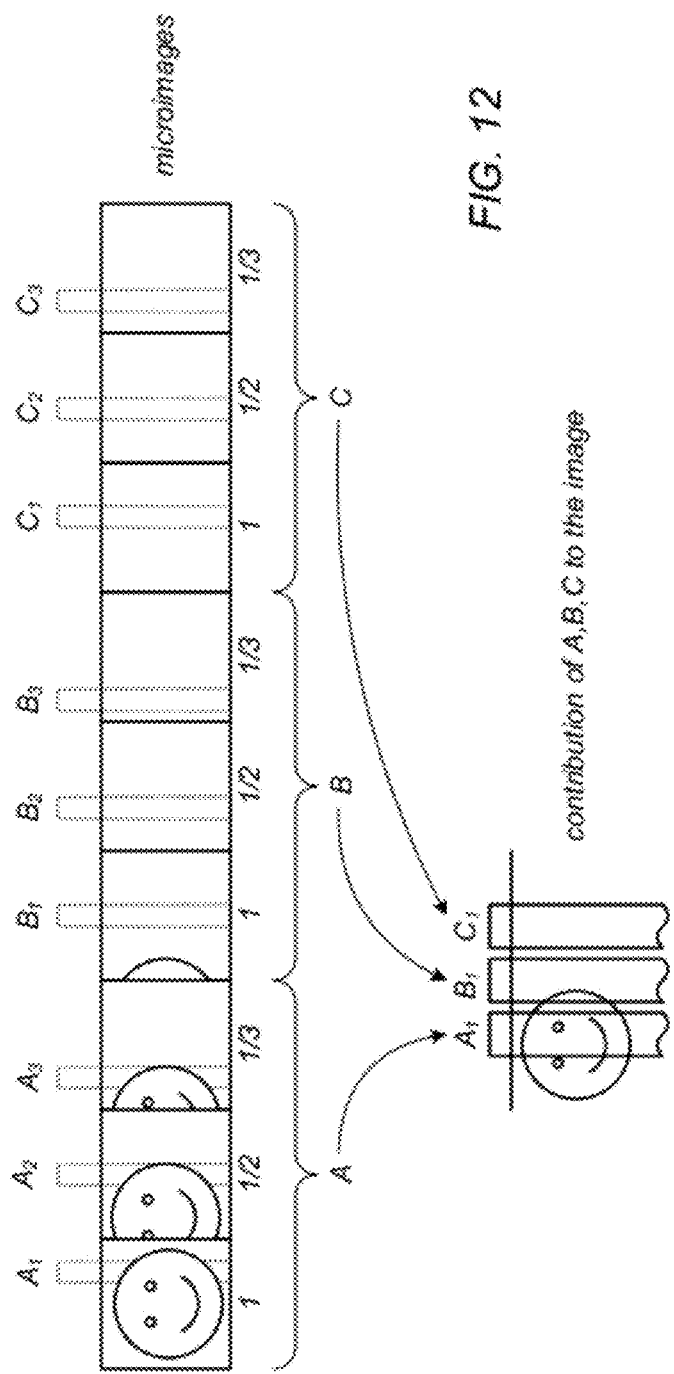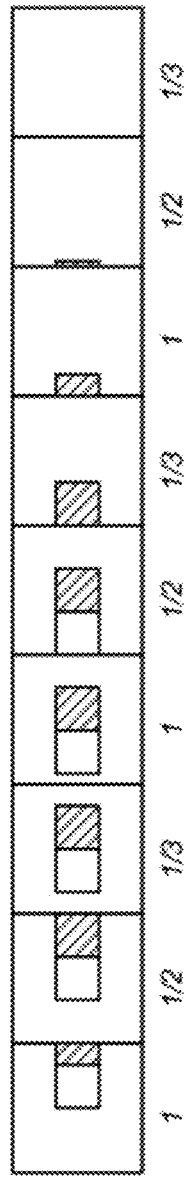
FIG. 12
FIG. 13

METHODS AND APPARATUS FOR HIGH-SPEED DIGITAL IMAGING

BACKGROUND

Description of the Related Art

In a conventional camera, the main lens maps the 3D world of the scene outside the camera into a 3D world inside camera. FIG. 1 illustrates imaging in a conventional camera. "Inside world" represents inside the camera. The shaded oval regions represent the order of depths in the outside world, and the corresponding depths inside the camera. One particular image plane inside the camera is shown. The mapping of the 3D world of the scene outside camera into a 3D world inside camera is governed by the lens equation:

$$\frac{1}{A} + \frac{1}{B} = \frac{1}{F}$$

where A and B are respectively the distances from the lens to the object plane and from the lens to the image plane. This equation is normally used to describe the effect of a single image mapping between two fixed planes. In reality, however, the lens equation describes an infinite number of mappings— it constrains the relationship between, but does not fix, the values of the distances A and B. That is, every plane in the outside scene (which is described as being at some distance A from the objective lens) is mapped by the objective lens to a corresponding plane inside of the camera at a distance B. When a sensor (e.g., conventional film, a charge-coupled device (CCD), etc.) is placed at a distance B between F and $\infty$ (infinity) inside the camera, the sensor captures an in-focus image of the corresponding plane at A that was mapped from the scene in front of the lens.

High Speed Imaging Technology

In high-speed imaging, or high speed photography, a series of images may be taken at a high sampling frequency or frame rate (e.g., 100 to 1000 frames a second or higher). The series of images may be viewed as or referred to as a "video clip." High-speed imaging requires technology capable of capturing the successive frames at the high frame rate. In conventional film camera technology, high-speed film cameras have been developed that use conventional film (e.g., 35 mm and 70 mm film) to capture film at hundreds or thousands of frames per second. In digital camera technology, however, the fact that a fixed electronic photosensor (e.g., a Charge-Coupled Device (CCD)) is used to capture digital images somewhat limits the technological paths that may be used to capture high-speed video. Conventionally, high speed digital imaging technology may rely on a technique such as an array of individual conventional digital cameras synchronized (e.g., via an electronic controller) to capture individual frames in a series, or on a single digital camera that can both generate exposures at the high frame rate and that can read the exposed frames off of the electronic photosensor (e.g., a CCD) fast enough to achieve the high frame rate. However, conventional electronic photosensors are generally limited as to how fast the individual frames can be read off the photosensor device, and thus have an upper limit on how fast of a frame rate they can support. Moreover, these conventional high-speed digital video camera technologies tend to be expensive.

Other high-speed digital imaging technologies have been proposed; however, these technologies tend to be large, complex, and expensive high-end devices.

Digital Micromirror Device (DMD) Technology

A digital micromirror device (DMD) may be implemented as an optical semiconductor that includes an array of very small mirrors (micromirrors) arranged in a rectangular array. Each micromirror may be viewed as corresponding to a pixel (in some cases, each micromirror may correspond to more than one pixel). The micromirrors can be individually rotated or toggled by the device to an ON or OFF state. In the ON state, light from a light source is reflected. In the OFF state, the light is directed elsewhere. To toggle between ON and OFF, a micromirror may be rotated, for example as little as 10 degrees. Each micromirror may be toggled at a very high rate: up to 32,000 (32K) times per second or higher. For a micromirror in the ON state, a corresponding pixel may be viewed as active or on, and in the OFF state, the corresponding pixel may be viewed as inactive or off. An example of a technology in which DMDs may be used is Texas Instruments® Digital Light Processing (DLP®) technology.

SUMMARY

Various embodiments of methods and apparatus for high-speed digital imaging are described. Embodiments may integrate a temporal modulation technology, for example digital micromirror device (DMD) technology, with focused plenoptic camera technology to produce a compact and relatively inexpensive high-speed digital video camera capable of capturing video clips at frame rates up to and including 32,000 (32K) frames per second, or higher. In embodiments, the temporal modulation technology (e.g., a DMD device) may be employed to temporally modulate image data captured in a single exposure; the temporally modulated image data is captured in a single raw image using focused plenoptic camera technology. A rendering method may then be applied to the raw image data to extract multiple frames "captured" at the frame rate, the frames each showing an image of a scene at a different time in a sequence, the duration of which is the exposure time.

In embodiments of the high-speed digital video camera, when an exposure is taken, e.g. when the shutter of the camera is cycled to capture a single exposure, light from a scene in front of the camera received at the main lens is refracted by the main lens to an image plane. A reflective component (e.g., a beam splitter) may reflect at least part of the light that strikes its surface, for example at a 90 degree angle, and thus forms a reflective image plane. The microlenses in a microlens array located in front of a digital micromirror device may be focused on the reflective image plane. The microlenses in microlens array may thus project microimages captured from the reflective image plane onto the digital micromirror device.

Each microlens in this microlens array may have one, two, or more micromirrors of the digital micromirror device located "under" the microlens. Thus, one or more micromirrors may correspond to each microlens in the microlens array. Thus, when the microlenses in the microlens array project microimages captured from the reflective image plane onto the digital micromirror device, each microimage is projected onto the (location of) one, two or more micromirrors corresponding to the respective microlens in the microlens array.

In some embodiments, to provide temporal modulation of the image data, the micromirrors corresponding to different microlenses in the microlens array may be toggled at different periodic rates, where 1 equals the exposure time (e.g., 1/1000 of a second). For example, the micromirror(s) corresponding to a first microlens may be toggled at period 1 (i.e., may be toggled ON and OFF once during the exposure time), the micromirror(s) corresponding to a second microlens may be toggled at period ½ (i.e., may be toggled ON and OFF twice during the exposure time), the micromirror(s) corresponding to a third microlens may be toggled at period ⅓ (i.e., may be toggled ON and OFF three times during the exposure time), and so on. Thus, the microlens(es) corresponding to each microlens are ON for approximately ½ of the exposure time determined by the shutter of the main camera, and OFF for approximately ½ of the exposure time. There may be many, perhaps thousands or even hundreds of thousands of microlenses in microlens array 360 in some embodiments. Thus, multiple sets of micromirror(s) corresponding to multiple microlenses may be toggled at each periodic rate. For example, if 16 periods (1, ½, ⅓, ... ¹⁄₁₆) are being used, and there are at least 16×N microlenses, then the micromirror(s) corresponding to N microlenses may be toggled at each periodic rate.

When the micromirror(s) under a given microlens in the microlens array are ON, they reflect the light received from the microlens back to the respective microlenses. The respective microlens then refracts that light back to approximately the location of the reflective image plane within the camera. Thus, the light reflected from the digital micromirror device back to the microlenses in the microlens array is refracted back to an image plane within the camera. The reflective component is only partially opaque, so at least some (e.g., 50%) of the light that strikes the surface of the reflective component passes through.

The microlenses in a separate microlens array of an image capture component (e.g., a focused plenoptic camera component) of the camera are focused on the image plane formed by the microlenses in the microlens array of a temporal modulation component (e.g., a digital micromirror device (DMD) component). Each microlens in this microlens array captures a portion of the image formed at the image plane by the temporal modulation component microlens array and projects the respective portion onto a region of a photosensor corresponding to the microlens in the microlens array of the image capture component. Multiple microimages, each corresponding to one of the microlenses in the microlens array of the image capture component, are thus formed at the photosensor. These microimages are each exposed for ½ of the shutter time of the main camera lens. However, different ones of the microimages are modulated at different temporal rates by the toggling of the micromirrors of the temporal modulation component at different periodic rates. Each microlens in the microlens array of the image capture component corresponds to a respective one of the microlenses in the microlens array of the temporal modulation component, each captures a microimage projected by its corresponding microlens to the image plane, and each projects the captured microimage onto the photosensor. The photosensor captures all of these microimages as a single, raw image.

In a rendering method, a raw image captured with a high-speed digital video camera as described above may be obtained. For each of P periodic rates (e.g., 16 different periodic rates, from 1 to ¹⁄₁₆) used to capture the microimages in the raw image, portions of the microimages captured at the periodic rate may be extracted from the microimages. Each microimage may be slightly shifted relative to its neighboring microimages. Thus, appropriate portions of microimages captured at each periodic rate may be extracted from the microimages. The extracted portions may be assembled appropriately to generate P intermediate images. These intermediate images, however, will be blurry. However, the periodic modulation provided by the temporal modulation component generates Haar wavelets. Thus, the captured microimages represent or include Haar wavelets in time. In a single exposure (the raw image data), amplitudes of all Haar wavelets have been captured. Thus, an inverse Haar wavelet transform may be applied to recover the temporal behavior of the captured image. Thus, a rendering technique may apply an inverse Haar wavelet transform to the P intermediate images to generate P final frames.

By varying the shutter speed and/or P (the number of different periodic rates used), a wide variety of frame rates may be achieved. Moreover, the components of the high-speed digital video camera may be assembled in a relatively small and lightweight camera body, not much if any larger than a typical conventional DSLR camera, and the cost of the components of the camera may be such that the cost of the high-speed digital video camera may be kept relatively low. Thus, embodiments may provide a compact, relatively inexpensive, and flexible high-speed digital video camera capable of capturing video clips at various frame rates up to and including 32,000 (32K) frames per second, or higher.

BRIEF DESCRIPTION OF THE DRAWINGS

FIGS. 12 and 13 graphically illustrate how the microimages are shifted in neighboring microimages captured at three periodic rates, and further illustrate extracting portions of the and assembling the microimages, according to some embodiments.

Figure 1:
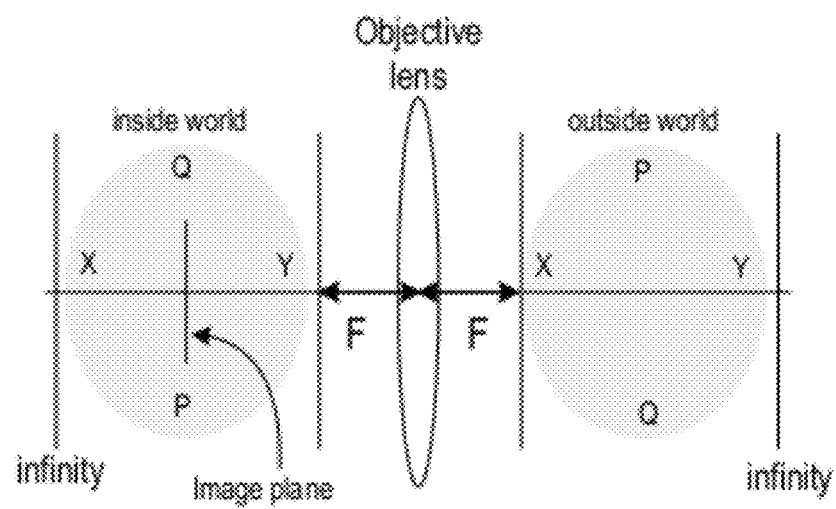
FIG. 1 illustrates imaging in a conventional camera.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for high-speed digital imaging are described. Embodiments may integrate temporal modulation technology, for example digital micromirror device (DMD) technology, with focused plenoptic camera technology to produce a compact and relatively inexpensive high-speed digital video camera capable of capturing video clips at frame rates up to and including 32,000 (32K) frames per second, or higher. In embodiments, the temporal modulation technology is used to temporally modulate image data captured in a single exposure; the temporally modulated image data is captured in a single raw image by focused plenoptic camera technology. A rendering method may then be applied to the raw image data to extract multiple frames "captured" at the frame rate, the frames each showing an image of a scene at a different time in a sequence, the duration of which is the exposure time.

In some embodiments, multiple raw images may be captured in sequence and individually processed by the rendering method to each produce multiple frames; the frames may then be combined to produce a longer video clip than can be produced in a single exposure.

Figure 2:
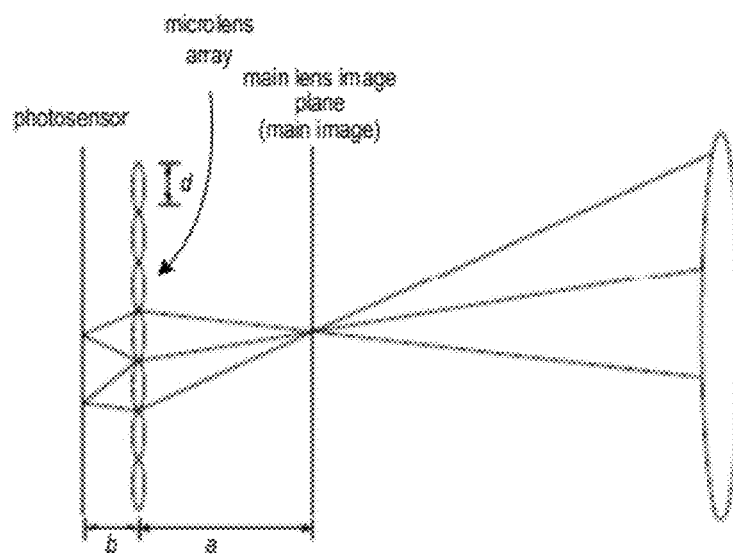
FIG. 2 illustrates imaging in a focused plenoptic camera, according to some embodiments.
Figure 3:
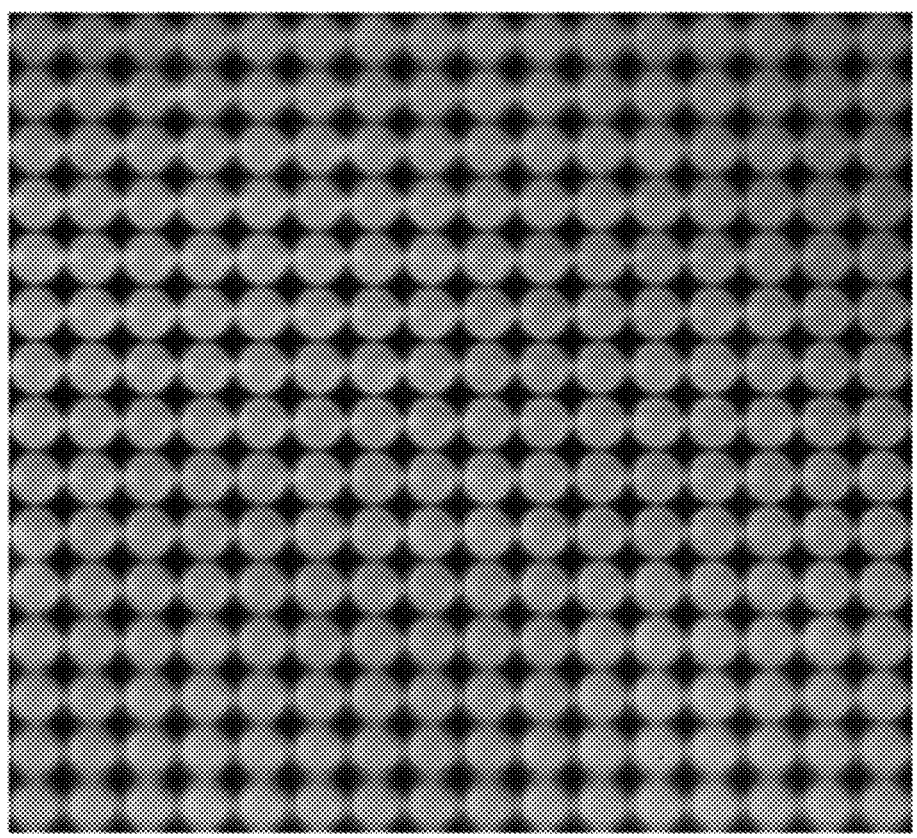
FIG. 3 shows a zoom into an example microlens array.

As previously noted, conventional electronic photosensors are generally limited as to how fast individual frames can be read off the photosensor device. Focused plenoptic camera technology employs a single photosensor device and an array of microlenses (which may be a single chip or an array of chips) located between the main camera lens and the photosensor device to capture multiple microimages of a scene, projected by the main camera lens onto an image plane "in the air" within the camera, in a single frame. (In the focused plenoptic camera, the microlenses are focused at the main image plane.) FIG. 2 illustrates imaging in a focused plenoptic camera according to some embodiments. FIG. 3 shows a zoom into an actual image of an example microlens array, and shows the individual microlenses and (black) chromium mask between the microlenses.

Figure 4:
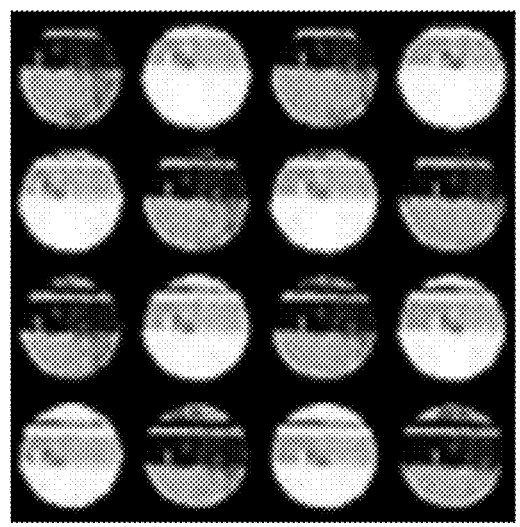
FIG. 4 shows an example portion of a single frame captured with a focused plenoptic camera using circular apertures.
Figure 5:
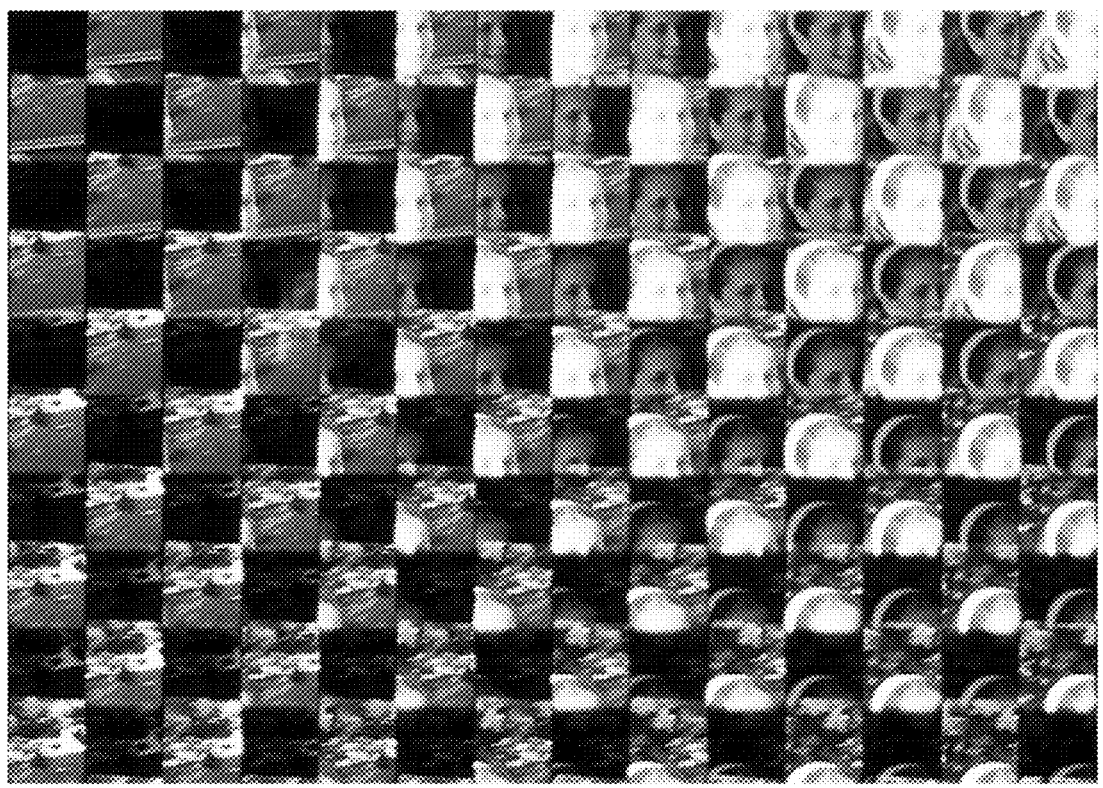
FIG. 5 shows an example portion of a single frame captured with a focused plenoptic camera using rectangular apertures

Each microlens projects a part of the image of the scene onto the photosensor device as a microimage; the photosensor device captures a single frame that includes all of the microimages. Adjacent microimages each include a portion of the image of the scene at the image plane; the microimage captured by one microlens is slightly shifted relative to the microimage captured by an adjacent microlens due to the slightly different angle at which the microlenses receive light from the main image plane. Thus, a group of neighboring microimages may each include, as a portion of the microimage, the same portion of the image of the scene at the image plane. The microimages may be circular, rectangular, or of some other geometric shape (e.g., hexagonal) depending upon the focused plenoptic camera configuration. FIG. 4 shows an example portion of a single frame captured with a focused plenoptic camera using circular apertures to thus produce circular microimages; note that available space on the photosensor is somewhat wasted. FIG. 5 shows an example portion of a single frame captured with a focused plenoptic camera using rectangular apertures and appropriate optical adjustments to capture rectangular microimages that more efficiently use the available space on the photosensor.

From a single frame consisting of tens, hundreds, or thousands of microimages captured using a focused plenoptic camera, multiple images of the scene may be generated using an appropriate rendering method. In embodiments, this capability of the focused plenoptic camera may be combined with temporal modulation technology (e.g., a DMD device) to provide a high-speed digital video camera that may capture a single image consisting of multiple microimages that include temporally-modulated image data. In some embodiments, a DMD device, in conjunction with a microlens array similar to the focused plenoptic camera microlens array, may be used to modulate the light in the time domain; the modulated light is captured at the photosensor according to the focused plenoptic camera technique. Embodiments also provide a rendering method that may render multiple frames modulated in time (e.g., a high-speed video clip) from the temporally-modulated raw image data (the array of raw microimages) captured by the high-speed digital video camera. Using this high-speed digital video camera technology and rendering method described herein, frame rates of up to 32K per second (or higher) may be achieved, much higher than can be achieved using conventional high-speed imaging technology that relies on a single photosensor in a single camera to consecutively capture multiple individual frames.

While embodiments are generally described as including an electronic photosensor that captures the raw image data, embodiments are possible that use conventional film to capture the raw image data. In these embodiments, the raw image may be digitized from a photograph or a negative and then processed according to the rendering method to generate multiple frames.

In the rest of this document, focused plenoptic camera technology is first described in more detail. After that, embodiments of the high-speed digital video camera that integrate focused plenoptic camera technology with temporal modulation technology are described. A rendering method for generating a high-speed "video clip" from a single raw image captured using the high-speed digital video camera is also described.

Focused Plenoptic Camera Technology

This section describes focused plenoptic camera technology. This technology is more fully described in U.S. patent application Ser. No. 12/271,389F, entitled "Methods and Apparatus for Full-Resolution Light-Field Capture and Rendering," filed Nov. 14, 2008, whose inventors are Todor G. Georgiev and Andrew Lumsdaine, and which is hereby incorporated by reference herein in its entirety.

FIG. 2 illustrates a focused plenoptic camera according to some embodiments. In conventional plenoptic cameras, the microlenses are placed and adjusted accurately to be exactly at one focal length f from the photosensor, where f is the focal length of the microlenses. In addition, in conventional plenoptic cameras, the microlens array is fixed at the image plane of the main or objective lens of the camera, and the microlenses in the array are focused at infinity. In contrast, in the focused plenoptic camera, in order to increase or maximize spatial resolution, i.e., to achieve sharper, higher spatial resolution, microlens images, the microlenses are focused on the image created by the main lens inside the camera and in front of the microlenses (the image plane of the main lens), instead of being focused on the main lens itself, as in conventional plenoptic cameras. In further contrast to conventional plenoptic cameras, the microlenses in embodiments of the focused plenoptic camera may be located at, or may be moved to, distances greater than f or less than f from the photosensor, where f is the focal length of the microlenses. In one embodiment, the array of microlenses may be placed at distance $4/3$ f from the photosensor. Other embodiments may place the array of microlenses at other distances that are multiples of f e.g. 1.5f or $3/4$ f In addition, embodiments of focused plenoptic cameras in which the distance of the microlens array from the photosensor is variable or adjustable, and in which other characteristics of the camera may be adjustable, are possible. For example, in some embodiments, the distance of the microlens array from the photosensor may be adjustable within the range 0.5f to 1.5f For a Keplerian telescopic case (the distance of the microlens array from the photosensor >f), a maximum useful distance may be 1.5 f, although distances greater than 1.5 f may be possible, if not practical. Thus, for the Keplerian telescopic case, a practical range for the distance of the microlens array from the photosensor may be f<b ≦1.5 f Various embodiments of the focused plenoptic camera implemented in digital cameras and in film cameras are possible. In digital cameras, the photosensor is a digital light-capturing device or medium such as a charge-coupled device (CCD) that captures and records the light in digital format. In film cameras, the photosensor is a film. Thus, "photosensor" as used in this section refers to digital media that are used in digital cameras to capture light and to film media that are used in film cameras to capture light, and more generally to any device or medium that may be used to capture light. Light-field images captured on a film using film camera embodiments may subsequently be digitized, for example using a high-resolution scanner, so that the captured light-field may be rendered, for example using the full-resolution light-field rendering method described herein, to produce high-resolution output images. Light-field images captured using digital camera embodiments may be directly rendered.

In addition to digital and film embodiments, fixed and adjustable embodiments of both digital camera and film camera embodiments of the focused plenoptic camera are possible. Referring to FIG. 2, in a fixed embodiment, the photosensor and the microlens array are at a fixed distance b from each other (the distance b is a multiple of f, for example $4/3$f $3/4$f, or 1.5 f, where f is the focal length of the microlenses). Note that b is used herein to designate the distance between the microlenses and the photosensor, while a is used herein to designate the distance between the microlenses and the image plane of the main or objective lens. In some embodiments, the microlens array/photosensor combination may be fixed at a location in the camera body. In some embodiments, the microlens array may be fixed in optical characteristics as well as in its physical location. In some embodiments, the main lens of the camera may also be fixed in optical characteristics and location, while possibly allowing for changes in shutter speed, aperture, focusing, etc. In adjustable embodiments, various manual or automatic mechanisms may be employed to change the distance b between the photosensor and the microlens array, to change the location of the microlens array/photosensor combination in the camera body, to change the distance from the main lens to the microlens array, to change the distance a between the microlenses and the image plane, and/or to swap or replace various components such as the microlens array and the main lens. In addition, the main lens of the camera may be swappable to use different main lenses, and may be adjustable according to aperture, shutter speed, focusing, distance from the microlens array, and so on. Embodiments where the microlens array may be swappable, so that microlens arrays with different numbers of microlenses and/or microlenses with different optical characteristics may be used, are also possible.

The optical characteristics of the optical system, including the optical characteristics of the lenses and the distances between the various components or elements, is important in capturing light-fields that may be rendered to yield high-resolution output images. Thus, in fixed embodiments, the microlenses, main lens, photosensor, and the relative physical location of these components in the camera may be determined to capture appropriate and satisfactory light-field images. In adjustable embodiments, some embodiments may include automated mechanisms that automatically adjust the positioning or other aspects of one or more of the components to capture appropriate and satisfactory light-field images. For example, if the user adjusts or replaces one component, the camera may automatically adjust one or more other components to compensate for the change. Alternatively, a human operator of an adjustable focused plenoptic camera may manually adjust the positioning or other aspects of one or more of the components, may replace one or more components with units that have different characteristics, or may insert other components (e.g., microsheet glass) to capture appropriate and satisfactory light-field images.

Figure 6:
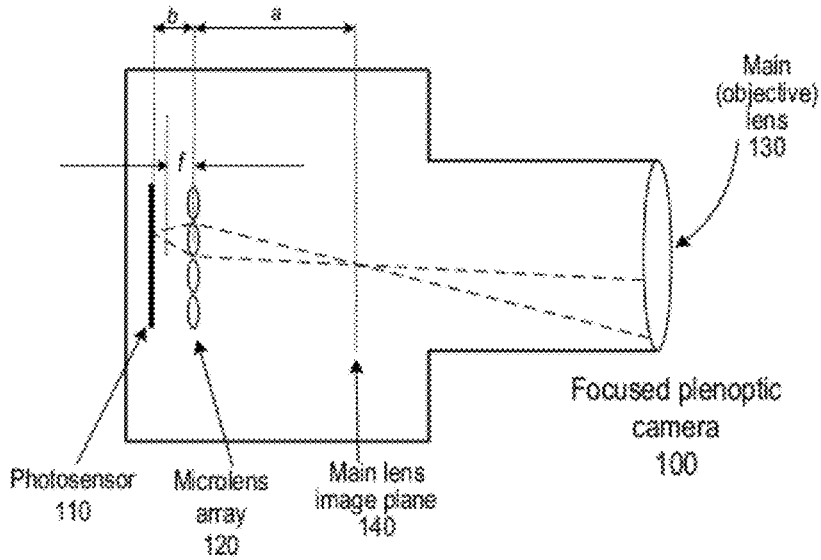
FIG. 6 is a block diagram illustrating a focused plenoptic camera according to some embodiments.

FIG. 6 is a block diagram illustrating a focused plenoptic camera according to some embodiments. It is noted that this is an example embodiment, and is not intended to be limiting. Focused plenoptic camera 100 may include a main (objective) lens 130, a microlens array 120, and a photosensor 110. Microlens array 120 may be located at a distance greater than f from photosensor 110, where f is the focal length of the microlenses in array 120. In addition, the microlenses in array 120 are focused on the image plane 140 of the main lens 130. In contrast, in conventional plenoptic cameras, the microlens array 106 is fixed at distance f from photosensor 108, and the microlenses in array 106 are focused on the main lens 104. In some embodiment, photosensor 110 may be conventional film; in other embodiments, photosensor 110 may be a device for digitally capturing light, for example a CCD. In some embodiment of a microlens array 120 that may be used in embodiments of focused plenoptic camera 100, the microlens array 120 may include 146,000 microlenses of diameter 0.25 mm and focal length 0.7 mm. Other configurations of microlens array 120, including different numbers of microlenses and/or microlenses with different optical characteristics, are possible and anticipated. FIG. 3 shows a zoom into an example microlens array, and shows individual microlenses and (black) chromium mask between the microlenses.

Focusing the microlenses on the image plane of the main lens in the focused plenoptic camera, rather than focusing on the main lens itself as in conventional plenoptic cameras, enables embodiments of the full-resolution light-field rendering methods and apparatus to more fully exploit positional information available in the captured flat (i.e., the 2D representation of the 4D light-field) captured by the light-field camera). Based on good focusing and high-resolution of the microlens images, embodiments of the focused plenoptic camera are able to achieve very high-resolution of rendered images when compared to conventional plenoptic cameras and conventional rendering methods.

Figure 7:
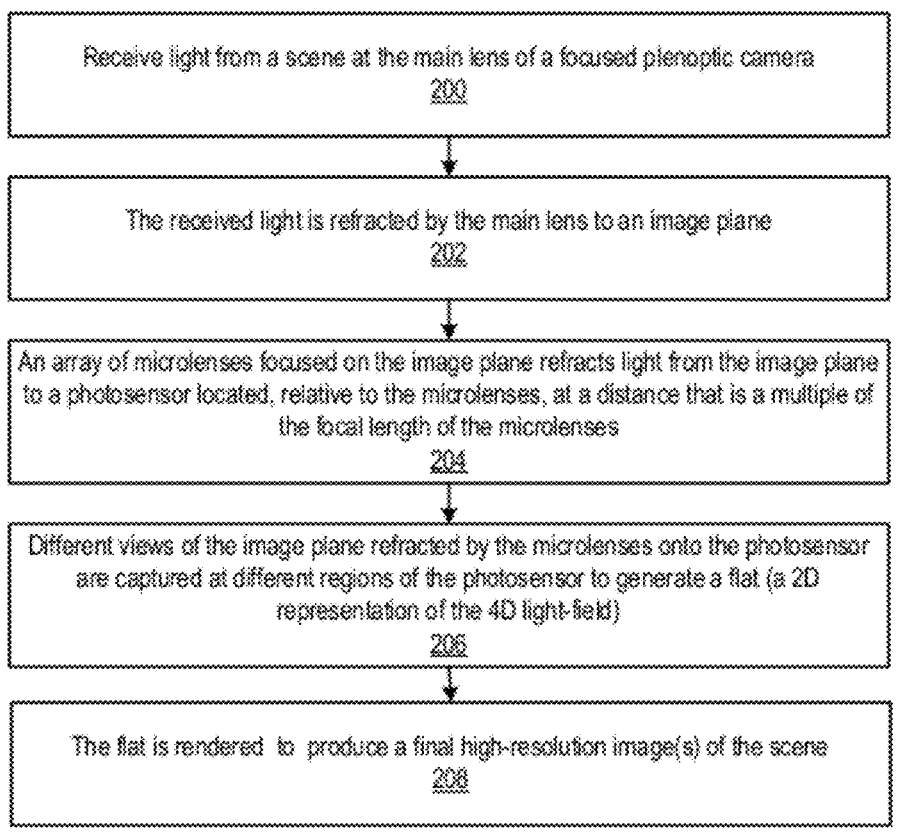
FIG. 7 is a flowchart illustrating how light is directed within a focused plenoptic camera according to some embodiments.

FIG. 7 is a flowchart illustrating how light may be directed within a focused plenoptic camera according to some embodiments. As indicated at 200, light from a scene is received at the main lens of a focused plenoptic camera. FIGS. 2 and 6 illustrate example focused plenoptic camera embodiments. As indicated at 202, the received light is refracted by the main lens to an image plane. As indicated at 204, an array of microlenses, the microlenses of which are focused on the image plane, refracts light from the image plane onto a photosensor located, relative to the microlenses, at a distance that is a multiple of the focal length f of the microlenses. For example, the distance between the microlenses and the photosensor may be ¾f, ⅘f, ⅝f, 1.5f, and so on. As indicated at 206, different views of the image plane, refracted by the microlenses onto the photosensor, are captured at different regions of the photosensor to generate a flat, which is a 2D representation of the 4D light-field. In some embodiments, the photosensor may be a device configured to digitally capture light such as a CCD, while in other embodiments the photosensor may be conventional film. As indicated at 208, the captured flat may be rendered to produce a final high-resolution image, or images, of the scene. For flats captured on conventional film, the flat may be digitized to generate a digitized flat before rendering.

High-Speed Digital Video Camera

Embodiments of a compact and relatively inexpensive high-speed digital video camera, capable of capturing video clips at frame rates up to 32,000 (32K) frames per second, or higher, are described. Embodiments of the high-speed digital video camera may integrate a temporal modulation technology such as digital micromirror device (DMD) technology with focused plenoptic camera technology to capture, in a single exposure, a single image consisting of multiple microimages, with each microimage including a portion of a scene captured by the main camera lens and projected onto an image plane within the camera. The image data in this single image includes temporally-modulated image data (modulated in the time domain by the temporal modulation component of the camera). A rendering method, described later in this document, may be used to render multiple frames representing a video clip of the scene at a high frame rate (up to 32K frames per second, or higher) from the temporally-modulated image data in the single image.

Figure 8:
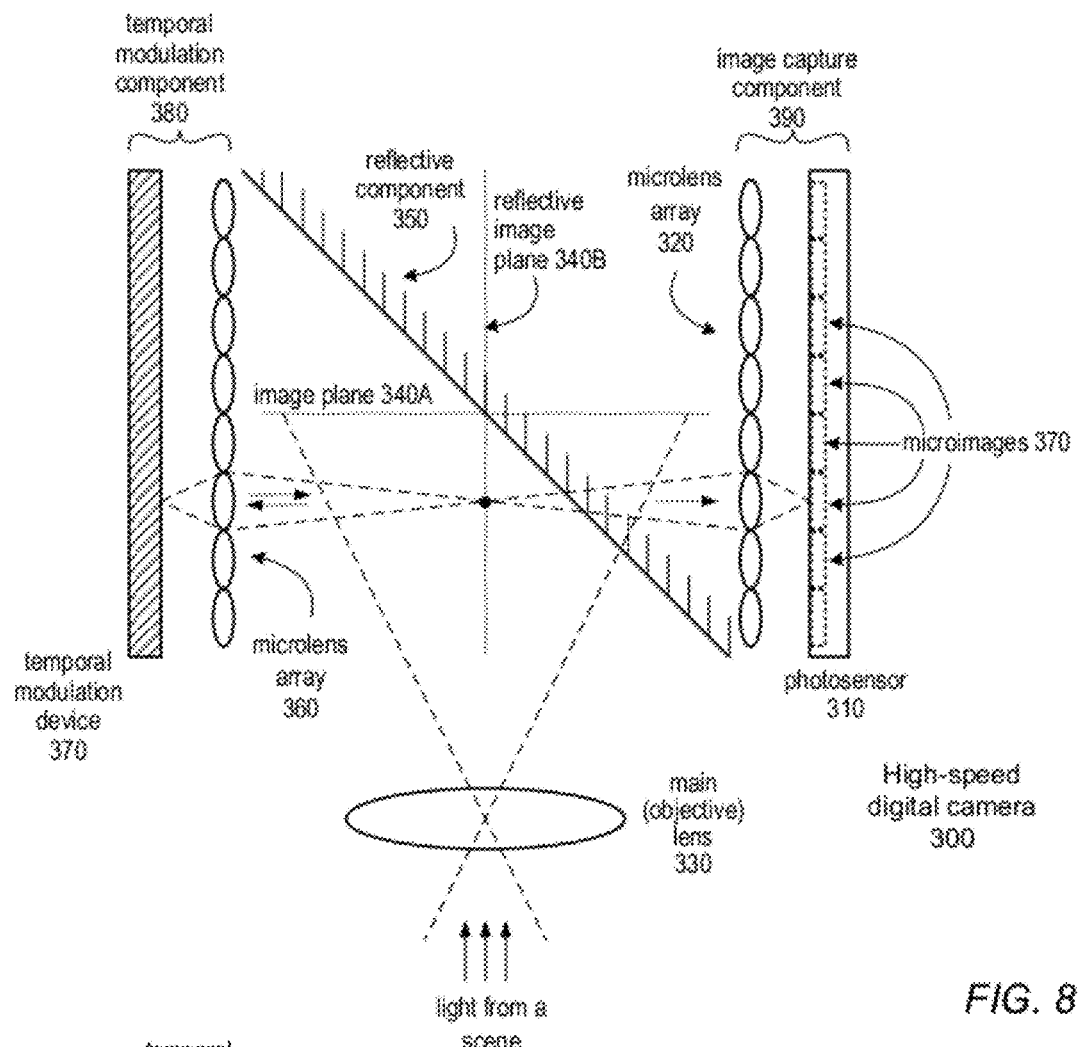
FIG. 8 illustrates a high-speed digital video camera according to at least some embodiments.

FIG. 8 illustrates a high-speed digital video camera according to at least some embodiments. High-speed digital video camera 300 may include a main (objective) lens 330, a reflective component 350 (e.g., a beam splitter), a microlens array 360 in front of a temporal modulation device 370, for example a digital micromirror device (DMD), and a second microlens array 320 located in front of a photosensor 310. High-speed digital video camera 300 may include other camera components, such as a shutter located in front of or behind the main lens 330, and a camera body that encloses at least some of the components of the camera. In at least some embodiments, microlens array 320 and photosensor 310 may be configured and arranged similarly as described above for various embodiments of a focused plenoptic camera. Microlens array 320 and photosensor 310 may be considered together as a focused plenoptic camera component, or more generally as an image capture component 390. Microlens array 360 and digital micromirror device 370 may be considered together as a temporal modulation component 380.

Reflective component 350 may be located within camera 300, and configured so as to reflect at least some light received from the main lens 320 towards the temporal modulation component 380. Reflective component 350 may, for example, be a mirror configured to reflect a portion of the light striking the mirror, while allowing the rest of the light to pass through the mirror. For example, reflective component 350 may be a mirror that reflects 50% of the light, and that allows 50% of the light to pass through. In at least some embodiments, reflective component 350 may be arranged so as to be angled at approximately 45 degrees from the image plane 340A of the main lens 320 formed inside the camera, with the surface of the reflective component 350 that faces the main lens 320 (at a 45 degree angle) also facing the temporal modulation component 380.

Temporal modulation component 380 and image capture component 390 may be located within camera 300, each on opposite sides of the reflective component 350.

Temporal modulation component 380 and image capture component 390 may be arranged so as to be substantially parallel to the main optical axis of the main lens 320, and thus substantially perpendicular to the image plane 340A of the main lens 320 formed inside the camera. As noted above, the surface of the reflective component 350 that faces the main lens 320 is directed towards the temporal modulation component 380, and not the image capture component 390.

When an exposure is taken, e.g. when the shutter of the camera 300 is cycled to capture a single exposure (e.g., for ¹⁄₁₀₀, ¹⁄₅₀₀, ¹⁄₁₀₀₀, ¹⁄₂₀₀₀, ¹⁄₄₀₀₀ of a second exposure time), light from a scene in front of the camera received at the main lens 320 is refracted by the main lens 320 to an image plane 340A (the duration of this light is the exposure time, e.g. ¹⁄₁₀₀₀ of a second, ¹⁄₂₀₀₀, and so on). Reflective component 350 reflects at least part of the light that strikes its surface at a 90 degree angle, and thus forms reflective image plane 340B. The microlenses in microlens array 360 may be focused on the reflective image plane 340B. The microlenses in microlens array 360 may thus project microimages captured from the reflective image plane 340B onto the digital micromirror device 370, similar to the way that the microlenses in a focused plenoptic camera project microimages captured from an image plane onto the surface of a photosensor.

Digital micromirror device 370 may, for example, be implemented as an optical semiconductor that includes an array of micromirrors arranged in a rectangular array. The micromirrors can be individually rotated or toggled by the digital micromirror device 370 to an ON or OFF state. In the ON state, light from a light source is reflected. In the OFF state, the light is directed elsewhere. To toggle between ON and OFF, a micromirror may be rotated by the digital micromirror device 370, for example to 10 degrees. Each micromirror may be individually toggled between ON and OFF at a very high rate, for example up to 32,000 (32K) times per second or higher.

As previously noted, microlens array 360 may be located in front of digital micromirror device 370, between the digital micromirror device 370 and the reflective component 350. Each microlens in microlens array 360 may have one, two, or more micromirrors of digital micromirror device 370 located "under" the microlens. Thus, one or more micromirrors may correspond to each microlens in microlens array 360. Thus, when the microlenses in microlens array 360 project microimages captured from the reflective image plane 340B onto the digital micromirror device 370, each microimage is projected onto the (location of) one, two or more micromirrors corresponding to the respective microlens in microlens array 360.

In some embodiments, to provide temporal modulation of the image data, the one, two or more micromirrors corresponding to different microlenses in microlens array 360 may be toggled at different periodic rates, where 1 equals the exposure time (e.g., 1/1000 of a second). For example, the micromirror(s) corresponding to a first microlens may be toggled at period 1 (i.e., may be toggled ON and OFF once during the exposure time), the micromirror(s) corresponding to a second microlens may be toggled at period ½ (i.e., may be toggled ON and OFF twice during the exposure time), the micromirror(s) corresponding to a third microlens may be toggled at period ⅓ (i.e., may be toggled ON and OFF three times during the exposure time), the micromirror(s) corresponding to a fourth microlens may be toggled at period ¼, and so on. For example, the micromirror(s) corresponding to a 16th microlens may be toggled at period 1/16 (i.e., may be toggled ON and OFF 16 times during the exposure time). Note that, in spite of the different periodic rates used at different microlenses in microlens array 360, the microlens(es) corresponding to each microlens are ON for approximately ½ of the exposure time determined by the shutter of the main camera, and OFF for approximately ½ of the exposure time.

In some embodiments, rather than setting the periodic rates at (1, ½, ⅓, . . . 1/P), where P is the maximum number of periods (e.g., 16), thus yielding P different periodic rates, the periodic rates may be set in other ways, for example at half of the previous rate (e.g., (1, ½, ¼, ⅛, 1/16), where 1/16 is the maximum periodic rate to be used).

Note that there may be many, perhaps thousands or even hundreds of thousands of microlenses in microlens array 360 in some embodiments. Thus, multiple sets of micromirror(s) corresponding to multiple microlenses may be toggled at each periodic rate. For example, if 16 periods (1, ½, ⅓, . . . 1/16) are being used, and there are at least 16×N microlenses, then the micromirror(s) corresponding to N microlenses may be toggled at each periodic rate.

When the micromirror(s) under a given microlens in microlens array 360 are ON, they reflect the light received from the microlens back to the respective microlens. (When the micromirror(s) under a given microlens in microlens array 360 are OFF, the light received from the microlens is essentially lost.) The respective microlens then refracts that light back to approximately the location of the reflective image plane 340B within the camera 300. Thus, the light reflected from the digital micromirror device 370 back to the microlenses in microlens array 360 is refracted back to an image plane within the camera 300. Note that reflective component 350 is only partially opaque, so that at least some (e.g., 50%) of the light that strikes the surface of reflective component 350 passes through.

The microlenses in microlens array 320 of image capture component 390 are focused on the image plane formed by the microlenses in microlens array 360. Each microlens in microlens array 320 captures a portion of the image formed at the image plane by microlens array 360 and projects the respective portion onto a region of the photosensor 310 corresponding to the microlens in microlens array 320. Multiple microimages 370, each corresponding to one of the microlenses in microlens array 320, are thus formed at the photosensor. These microimages 370 are each exposed for ½ of the shutter time of the main camera lens. However, different ones of the microimages 370 are modulated at different temporal rates by the toggling of the micromirrors of the digital micromirror device at different periodic rates. Note that each microlens in microlens array 320 corresponds to a respective one of the microlenses in microlens array 360, captures a microimage projected by its corresponding microlens in microlens array 360 to the image plane, and projects the captured microimage 370 onto the photosensor 310. The photosensor 310 captures all of these microimages as a single, raw image.

Figure 9:
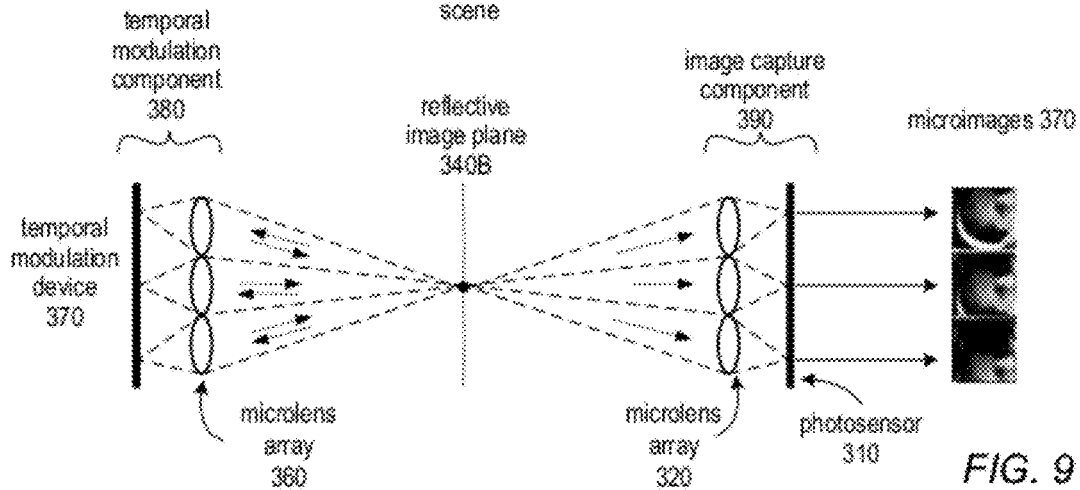
FIG. 9 shows the optics within a high-speed digital video camera for three microlenses in each microlens array, according to some embodiments.

FIG. 9 shows the optics within the camera 300 for three microlenses in each microlens array, according to some embodiments. Each microlens in microlens array 320 projects a part of the image of the scene onto the photosensor 310 as a microimage 370; the photosensor 310 captures a single frame that includes all of the microimages 370. Adjacent microimages 370 each include a portion of the image formed at an image plane by microlens array 360; the microimage 370 captured by one microlens is slightly shifted relative to the microimage captured by an adjacent microlens due to the slightly different angle at which the microlenses in microlens array 320 receive light from the image plane. Thus, a group of neighboring microimages 370 may each include, as a portion of the microimage 370, the same portion of the image, but slightly shifted either left, right, up, or down. The microimages 370 may be circular, rectangular, or of some other geometric shape (e.g., hexagonal) depending upon the camera configuration. FIG. 4 shows an example portion of a single frame captured using circular apertures to thus produce circular microimages; note that available space on the photosensor is somewhat wasted. FIG. 5 shows an example portion of a single frame captured using rectangular apertures and appropriate optical adjustments to capture rectangular microimages that more efficiently use the available space on the photosensor.

Rendering Method for Images Captured with the High-Speed Digital Video Camera

Via the temporal modulation of the micromirrors in the temporal modulation component 380 as described above, all pixels in a microimage 370 corresponding to a given microlens are turned OFF or ON at the same time; this is done independently for each microimage 370. As noted above, a group of neighboring microimages 370 may each include, as a portion of the microimage 370, the same portion of the image, but slightly shifted either left, right, up, or down. Assume that a given portion of a scene is imaged 16 times in different microimages and that there is no parallax. Assume the exposure time is $\frac{1}{2000}$ of a second. For the 16 microimages, the first microimage is modulated with period 1 (open and close the mirrors once during exposure), the second image is modulated with period $\frac{1}{2}$ (open and close the mirrors 2 times during exposure), and so on. The 16th image is modulated with period $\frac{1}{16}$.

This type of modulation generates Haar wavelets. Thus, the microimages represent or include Haar wavelets in time. In a single exposure (the raw image data), amplitudes of all Haar wavelets have been captured. Thus, an inverse Haar wavelet transform may be applied to recover the temporal behavior of the captured image. Assuming 16 periodic rates applied to different microimages and a shutter speed of $\frac{1}{2000}$, the inverse wavelet transform would yield a 16-frame video clip at the speed of the temporal modulation component 380, which may, for example, be 32,000 frames per second.

Figures 10, 11:
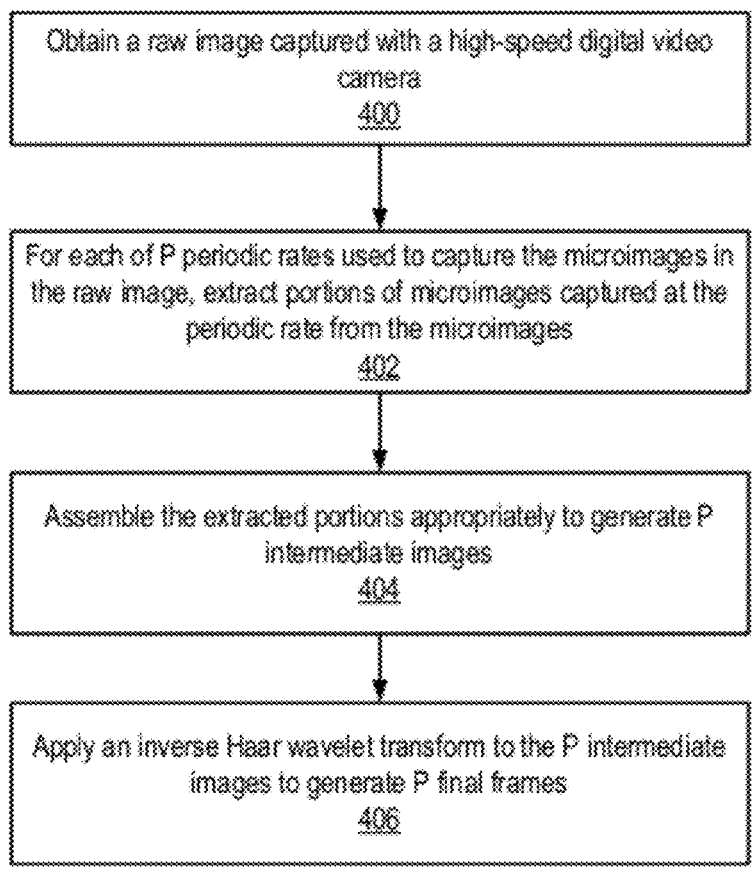
FIG. 10 illustrates a portion of the microimages that may be captured by a photosensor with an example number of periodic rates provided by the differential modulation of the micromirrors in the temporal modulation component, according to some embodiments.
FIG. 11 illustrates a method for rendering frames from a raw image captured with a high-speed digital video camera, according to some embodiments.

FIG. 10 illustrates a portion of the microimages that may be captured by the photosensor 310 with an example 16 periodic rates provided by the differential modulation of the micromirrors in the temporal modulation component 380, with the periodic rate at which each microimage is captured shown, according to some embodiments. This Figure shows 64 microimages. Note that any 4×4 box of the microimages (e.g., as shown by the two dashed boxes) includes one microimage captured at each of the 16 periodic rates. Thus, in some embodiments, the microimages may be processed by the rendering method in blocks. Note that other numbers of periodic rates may be used, and that other arrangements of the periodic rates may be used than the example shown in FIG. 10.

FIG. 11 illustrates a method for rendering frames from a raw image captured with a high-speed digital video camera, for example as illustrated in FIG. 8, according to some embodiments. As indicated at 400, a raw image captured with a high-speed digital video camera may be obtained. As indicated at 402, for each of P periodic rates (e.g., 16 different periodic rates, from 1 to $\frac{1}{16}$) used to capture the microimages in the raw image, portions of the microimages captured at the periodic rate may be extracted from the microimages. As previously noted, each microimage may be slightly shifted relative to its neighboring microimages. Thus, appropriate portions of microimages captured at each periodic rate may be extracted from the microimages. As indicated at 404, the extracted portions may be assembled appropriately to generate P intermediate images. These intermediate images, however, will be blurry. FIGS. 12 and 13 graphically illustrate how the microimages are shifted in neighboring microimages captured at three periodic rates, and further illustrate extracting portions of the and assembling the microimages, according to some embodiments. As indicated at 406, an inverse Haar wavelet transform may be applied to the P intermediate images to generate P final frames.

As an example, if the shutter speed of the camera 300 is $\frac{1}{1000}$ of a second, and P=16, then the frame rate of a video clip produced by the above methods and apparatus is 16K frames per second. Each final frame produced by the above method will be an image of the scene separated in time from its neighboring frame(s) by $\frac{1}{16000}^{th}$ of a second. As another example, with a shutter speed of $\frac{1}{2000}$ of a second and P=16, the frame rate is 32K frames per second. Each final frame produced by the above method will be an image of the scene separated in time from its neighboring frame(s) by $\frac{1}{32000}^{th}$ of a second. It can be seen that by varying the shutter speed and/or P (the number of different periodic rates used), a wide variety of frame rates may be achieved. Note that, in some embodiments, P may be fixed. In other embodiments, P may be adjustable by the user to achieve different frame rates.

Moreover, the components of the high-speed digital video camera may be assembled in a relatively small and lightweight camera body, not much if any larger than a typical conventional DSLR camera, and the cost of the components of the camera may be such that the cost of the high-speed digital video camera may be kept relatively low. Thus, embodiments may provide a compact, relatively inexpensive, and flexible high-speed digital video camera capable of capturing video clips at various frame rates up to and including 32,000 (32K) frames per second, or higher.

Implementations of Rendering Methods

Figure 14:
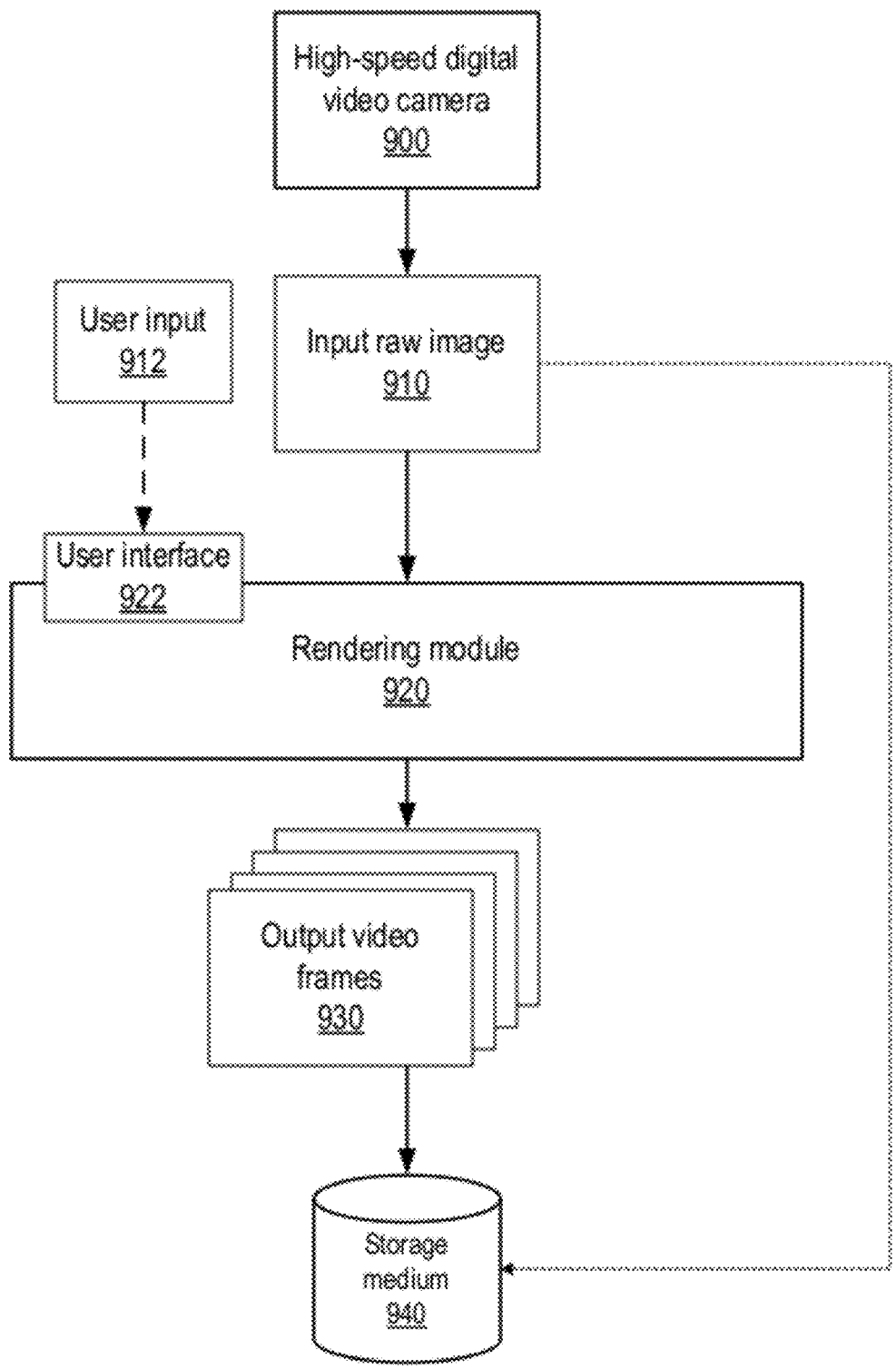
FIG. 14 illustrates an example rendering module rendering multiple high-speed frames from an image captured by a high-speed digital video camera, according to some embodiments.
Figure 15:
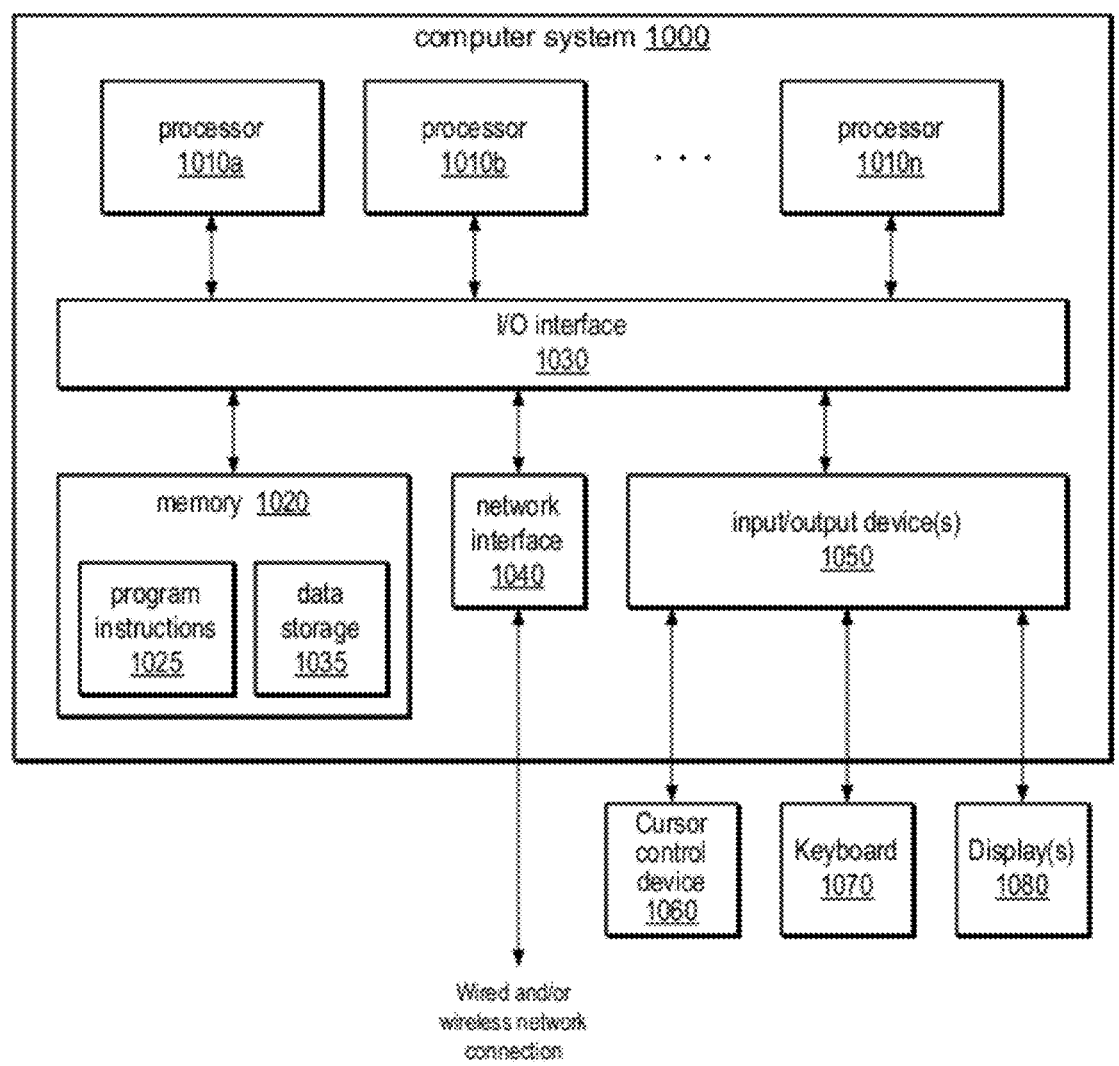
FIG. 15 illustrates an example computer system that may be used in embodiments.

FIG. 14 illustrates a rendering module rendering images from a raw image captured, for example, by various embodiments of a high-speed digital video camera as described herein, for example as illustrated in FIG. 8. Rendering module 920 may, for example, implement a rendering method as described in FIGS. 11 through 13. FIG. 15 illustrates an example computer system on which embodiments of rendering module 920 may be implemented. In some embodiments of a high-speed digital video camera, rendering module 920 may be implemented in the camera, e.g. in a captured data processing module. Referring to FIG. 15, rendering module 920 receives an input raw image 910 captured by a high-speed digital video camera, for example as illustrated in FIG. 8. Rendering module 920 then processes the input image 910 according to an appropriate rendering method or methods, for example as described in FIGS. 11 through 13. Rendering module 920 generates as output two or more video frames 930. The video frames 930 may, for example, be stored to a storage medium 940, such as system memory, a disk drive, DVD, CD, etc. The dashed line from input raw image 910 to storage medium 940 indicates that the original (input) image 910 may also be stored. One or more intermediate images that may be generated by module 920 may also be stored.

In some embodiments, rendering module 920 may provide a user interface 922 via which a user may interact with the module 920, for example to specify or otherwise manage input raw images 910 and output video frames 930 as described herein.

Example System

Embodiments of a rendering module, such as the example rendering module described in FIG. 14, may be executed on one or more computer systems, which may interact with various other devices. One such computer system is illustrated by FIG. 15. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. In some embodiments, computer system 1000 may be a digital camera.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the rendering methods disclosed herein, for example in relation to FIGS. 11 through 14, may be implemented at least in part by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a rendering module in FIG. 14, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 24, memory 1020 may include program instructions 1025, configured to implement embodiments of a rendering module as described in FIG. 14, and data storage 1035, comprising various data accessible by program instructions 1025. In one embodiment, program instructions 1025 may include software elements of embodiments of a rendering module as illustrated in FIG. 14. Data storage 1035 may include data that may be used in embodiments. In other embodiments, other or different software elements and data may be included.

Those skilled in the art will appreciate that computer system 1000 is merely illustrative and is not intended to limit the scope of a rendering module as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A camera, comprising:
an objective lens, wherein the objective lens is configured to refract light from a scene located in front of the camera to form an image of the scene at an image plane within the camera for an exposure duration determined by shutter speed of the camera;
a reflective component configured to reflect the image of the scene at the image plane to generate a reflective image plane within the camera;
a temporal modulation component configured to:
receive light from the reflective image plane;
modulate different portions of the received light in the temporal domain according to P periodic rates, wherein P is an integer greater than or equal to 2; and
reflect the temporally modulated different portions of the light to form an image of the temporally modulated different portions of the light within the camera; and
an image capture component comprising a photosensor configured to capture light projected onto the photosensor, wherein the image capture component is configured to project the image of the temporally modulated different portions of the light formed within the camera by the temporal modulation component onto the photosensor.

2. The camera as recited in claim 1, wherein the reflective image plane is substantially perpendicular to the image plane formed by the objective lens.

3. The camera as recited in claim 1, wherein the reflective component reflects a portion of light that strikes the reflective component and allows a remaining portion of the light that strikes the reflective component to pass through.

4. The camera as recited in claim 1, wherein the temporal modulation component comprises a micromirror array comprising a plurality of micromirrors, wherein each micromirror is configured to toggle between an on position in which the micromirror reflects light and an off position in which the micromirror deflects light.

5. The camera as recited in claim 4, wherein the temporal modulation component further comprises an optical element array positioned between the reflective component and the micromirror array, wherein the optical element array comprises a plurality of optical elements, wherein the plurality of optical elements are focused on the reflective image plane, wherein each optical element of the optical element array is configured to project a separate portion of the image of the scene formed at the reflective image plane onto a separate location on the micromirror array, wherein each location comprises one or more micromirrors.

6. The camera as recited in claim 5, wherein the one or more micromirrors at each location corresponding to the optical elements in the optical element array are configured to toggle on and off at a periodic rate, wherein the one or more micromirrors of at least one location are configured to toggle on and off at a different periodic rate than the periodic rate at which the one or more micromirrors of at least one other location are toggled on and off to provide temporal modulation of the received light.

7. The camera as recited in claim 6, wherein the optical element array is a microlens array comprising a plurality of microlenses.

8. The camera as recited in claim 1, wherein the image capture component further comprises an optical element array positioned between the photosensor and the micromirror array, wherein the optical element array comprises a plurality of optical elements, wherein the plurality of optical elements are focused on the image of the temporally modulated different portions of the light formed within the camera by the temporal modulation component, wherein each optical element of the optical element array is configured to project a separate portion of the image of the image of the temporally modulated different portions of the light onto a separate location on the photosensor.

9. The camera as recited in claim 1, wherein the optical element array is a microlens array comprising a plurality of microlenses.

10. The camera as recited in claim 1, wherein the photosensor is configured to capture the image of the temporally modulated different portions of the light projected onto the photosensor by the image captured component, wherein each of the temporally modulated different portions is in a separate region of the captured image.

11. The camera as recited in claim 10, wherein the camera is configured to store the captured image of the temporally modulated different portions of the light to a memory device.

12. The camera as recited in claim 10, wherein the captured image of the temporally modulated different portions of the light is configured to be rendered according to a rendering technique that renders P different video frames from the captured image, wherein each video frame includes a different image of the scene corresponding to a different time within the exposure duration, and wherein the rendering technique employs an inverse wavelet transform to render the P different video frames.

13. The camera as recited in claim 1, wherein the P periodic rates comprise a first periodic rate of 1, wherein, to modulate a particular portion of the light at the periodic rate of 1, the temporal modulation component is configured to switch between reflecting the light and deflecting the light once during the exposure duration, and wherein, to modulate a different portion of the light at the periodic rate of P, the temporal modulation component is configured to switch between reflecting the light and deflecting the light P times during the exposure duration.

14. A method, comprising:
receiving light from a scene at an objective lens of a camera;
refracting light from the objective lens to form an image of the scene at an image plane within the camera for an exposure duration determined by shutter speed of the camera;
reflecting, by a reflective component of the camera, the image of the scene at the image plane to generate a reflective image plane within the camera;
receiving light from the reflective image plane at a temporal modulation component of the camera;
modulating, by the temporal modulation component, different portions of the received light in the temporal domain according to P periodic rates, wherein P is an integer greater than or equal to 2;
reflecting, by the temporal modulation component, the temporally modulated different portions of the light to form an image of the temporally modulated different portions of the light within the camera;
projecting, by an image capture component of the camera, the image of the temporally modulated different portions of the light formed within the camera by the temporal modulation component onto a photosensor of the camera; and
capturing, by the photosensor, the image of the temporally modulated different portions of the light projected onto the photosensor by the image captured component, wherein each of the temporally modulated different portions is in a separate region of the captured image.

15. The method as recited in claim 14, further comprising applying a rendering technique to the captured image of the temporally modulated different portions of the light to generate P different video frames, wherein each video frame includes a different image of the scene corresponding to a different time within the exposure duration.

16. The method as recited in claim 14, further comprising:
for each of the P periodic rates, rendering an intermediate image from a subset of the different portions of the light in the captured image that correspond to the particular periodic rate to generate P intermediate images; and
applying an inverse wavelet transform to the P intermediate images to generate P different video frames, wherein each video frame includes a different image of the scene corresponding to a different time within the exposure duration.

17. The method as recited in claim 14, wherein the temporal modulation component comprises a micromirror array comprising a plurality of micromirrors, wherein the method further comprises toggling each micromirror between an on position in which the micromirror reflects light and an off position in which the micromirror deflects light.

18. The method as recited in claim 17, wherein the temporal modulation component further comprises an optical element array positioned between the reflective component and the micromirror array, wherein the optical element array comprises a plurality of optical elements, wherein the plurality of optical elements are focused on the reflective image plane, and wherein the method further comprises each optical element of the optical element array projecting a separate portion of the image of the scene formed at the reflective image plane onto a separate location on the micromirror array, wherein each location comprises one or more micromirrors.

19. The method as recited in claim 18, wherein the method further comprises toggling on an off each of the one or more micromirrors at each location corresponding to the optical elements in the optical element array at a periodic rate, wherein the one or more micromirrors of at least one location are toggled on and off at a different periodic rate than the periodic rate at which the one or more micromirrors of at least one other location are toggled on and off to provide temporal modulation of the received light.

20. The method as recited in claim 14, wherein the image capture component further comprises an optical element array positioned between the photosensor and the micromirror array, wherein the optical element array comprises a plurality of optical elements, wherein the plurality of optical elements are focused on the image of the temporally modulated different portions of the light formed within the camera by the temporal modulation component, and wherein the method further comprises each optical element of the optical element array projecting a separate portion of the image of the image of the temporally modulated different portions of the light onto a separate location on the photosensor.

* * * * *